United States Patent [19]
Dussault

[11] Patent Number: 5,632,355
[45] Date of Patent: May 27, 1997

[54] GREASE LUBRICATING SYSTEM EMPLOYING AN INJECTOR RESET VALVE

[75] Inventor: Christopher C. Dussault, Bennington, Vt.

[73] Assignee: Bijur Lubricating Corporation, Bennington, Vt.

[21] Appl. No.: 487,954

[22] Filed: Jun. 7, 1995

[51] Int. Cl.⁶ .................................................. F16N 27/00
[52] U.S. Cl. ...................................... 184/7.4; 184/8
[58] Field of Search ..................................... 184/7.4, 8

[56] References Cited

U.S. PATENT DOCUMENTS

| | | | |
|---|---|---|---|
| 1,942,097 | 1/1934 | Hallerberg | 184/7.4 |
| 3,119,463 | 1/1964 | Jackson | 184/7.4 |
| 3,209,956 | 10/1965 | McKenzie | 184/7.4 |
| 3,809,184 | 5/1974 | Smith et al. | 184/7.4 |
| 3,995,717 | 12/1976 | Kroffke | 184/7.4 |
| 4,711,321 | 12/1987 | Hedlund | 184/7.4 |

*Primary Examiner*—Thomas E. Denion
*Attorney, Agent, or Firm*—Caesar, Rivise, Bernstein, Cohen & Pokotilow, Ltd.

[57] ABSTRACT

A grease lubricating system includes a plurality of injectors for distributing grease to a plurality of lubrication points, an injector reset valve for resetting the injectors and a pump for supplying grease. The injector reset valve is located between the pump and the plurality of injectors and includes a piston and a large heavy duty spring which urges the piston into sealing engagement with an inlet port of the injector reset valve during a reset position of the valve. During a pressurizing portion of a pump cycle, grease entering the injector reset valve moves the piston out of sealing engagement with the inlet port of the injector reset valve enabling grease to flow from the inlet port through an internal chamber of the injector reset valve and out of a outlet port to input ports of the injectors through an injector distribution junction. Each injector then delivers grease to its respective lubrication point. During the depressurizing portion of a pump cycle, the spring in the injector reset valve causes the piston to move back to its reset position, the piston thereby displacing sufficient grease to lower the pressure of the grease at the input ports of the injectors so that the injectors reset.

22 Claims, 6 Drawing Sheets ced during the pressurizing portion of a 20
GREASE LUBRICATING SYSTEM EMPLOYING AN INJECTOR RESET VALVE

BACKGROUND OF THE INVENTION

The present invention relates to lubricating systems generally and, more particularly, to grease lubricating systems employing an injector reset valve.

Centralized lubricating systems function to distribute oil or grease from a centralized source to a plurality of lubrication points in a machine or a group of machines. A typical centralized lubrication system includes a reservoir to store lubricant, a pump to deliver the lubricant, injectors to dispense a quantity of lubricant to lubrication points in the machine and associated fittings to connect the components.

In order for the system to operate properly, it is necessary for the injectors to function reliably. A typical injector utilizes a piston which must be reset at the end of every pump cycle. Typically, injectors reset by means of a spring which is compressed during the pressurizing portion of a pump cycle and then returned to its initial position during the depressurizing portion of a cycle. This requires that a small amount of grease be pushed back towards the pump to allow the injector piston to reset. Because grease has a higher viscosity than oil, accomplishing this becomes a problem when working with grease systems. Much higher pressures are required to push grease than to push oil.

Current commercially available grease injectors accomplish this with a large, heavy duty spring in each injector. Larger springs, however, are more costly to manufacture. Additionally, larger springs require a larger injector body to house the larger spring. This, in turn, leads to higher stock material, machining and inventory costs. As a result, current injectors designed for grease lubricating systems are significantly more expensive than similar injectors designed for oil lubricating systems.

SUMMARY OF THE INVENTION

Accordingly, it is an object of the present invention to provide a grease lubrication system which may employ oil lubrication components and, in particular, oil injectors.

Another object of the invention is to provide an injector reset valve which may be used with oil injector valves in a grease lubricant system so as to avoid the need for larger springs in the injectors.

Still another object of the invention is to provide a low cost and reliable grease lubrication system.

The foregoing and other objects of the invention are achieved by a grease lubrication system, which in accordance with the present invention, includes at least one injector; a pump for supplying grease, the pump having a pumping cycle with a pressurizing portion and a depressurizing portion; and means for reducing the pressure at the injector during the depressurizing portion of a pump cycle. The injector has an input port for receiving grease, an outlet port for discharging grease and is actuable between an operative position in which grease may flow from the inlet port to the outlet port and a reset position in which grease is prevented from flowing from the input port to the outlet port. The injector is actuated to the operative position when the pressure of grease at the input port is at least equal to a first predetermined level and is actuated to the reset position when the pressure of grease at the input port is no higher than the second predetermined level. The pressure reducing means is positioned between the pump and the injector and functions to reduce the pressure at the input port of the injector to a level no higher than a second predetermined level during the depressurizing portion of the pump cycle to thereby cause the injector to be actuated to its reset position.

Other features and advantages of the present invention will become apparent from the following description of the invention which refers to the accompanying drawings.

BRIEF DESCRIPTION OF THE DRAWING(S)

Figure 3:
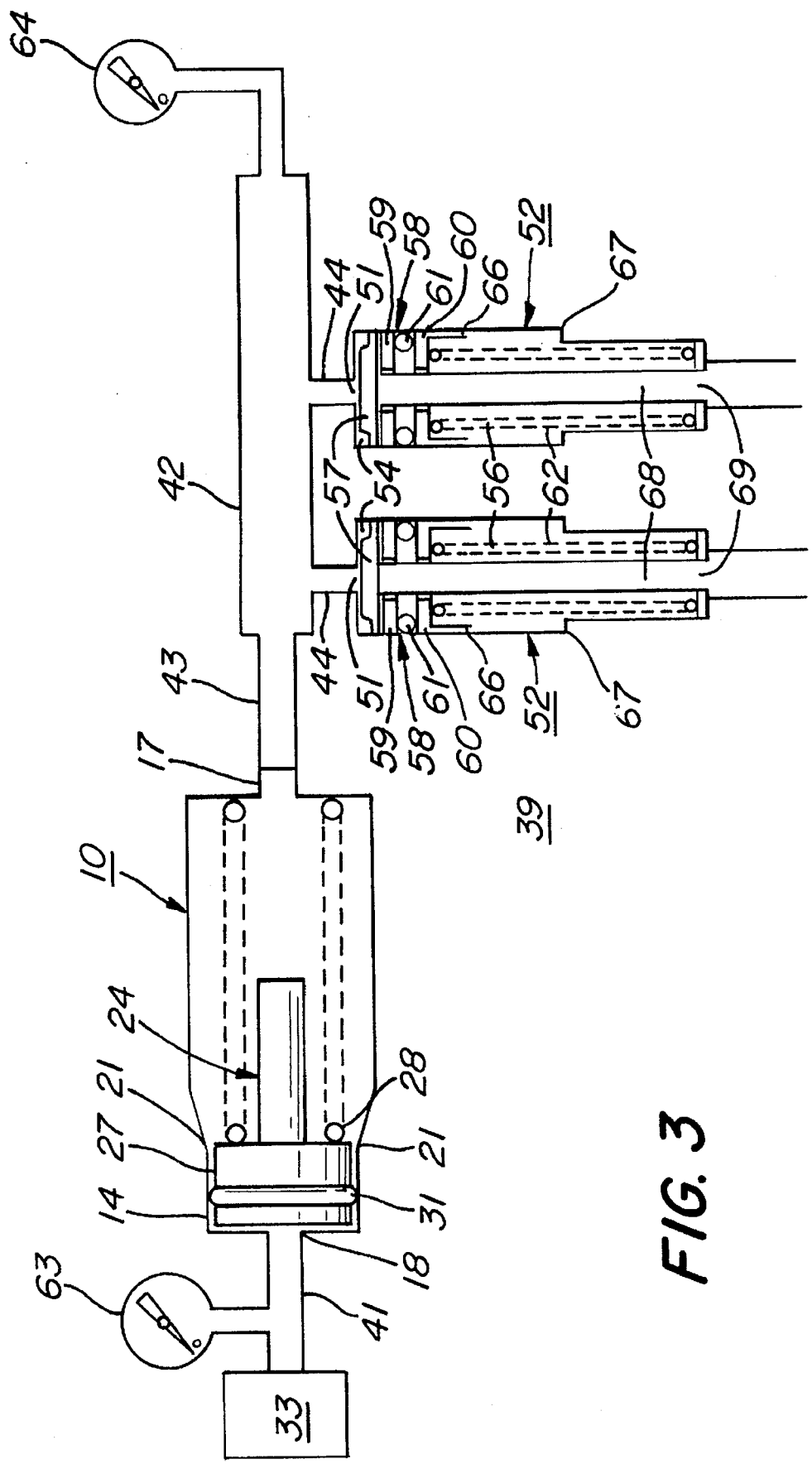
Figure 4:
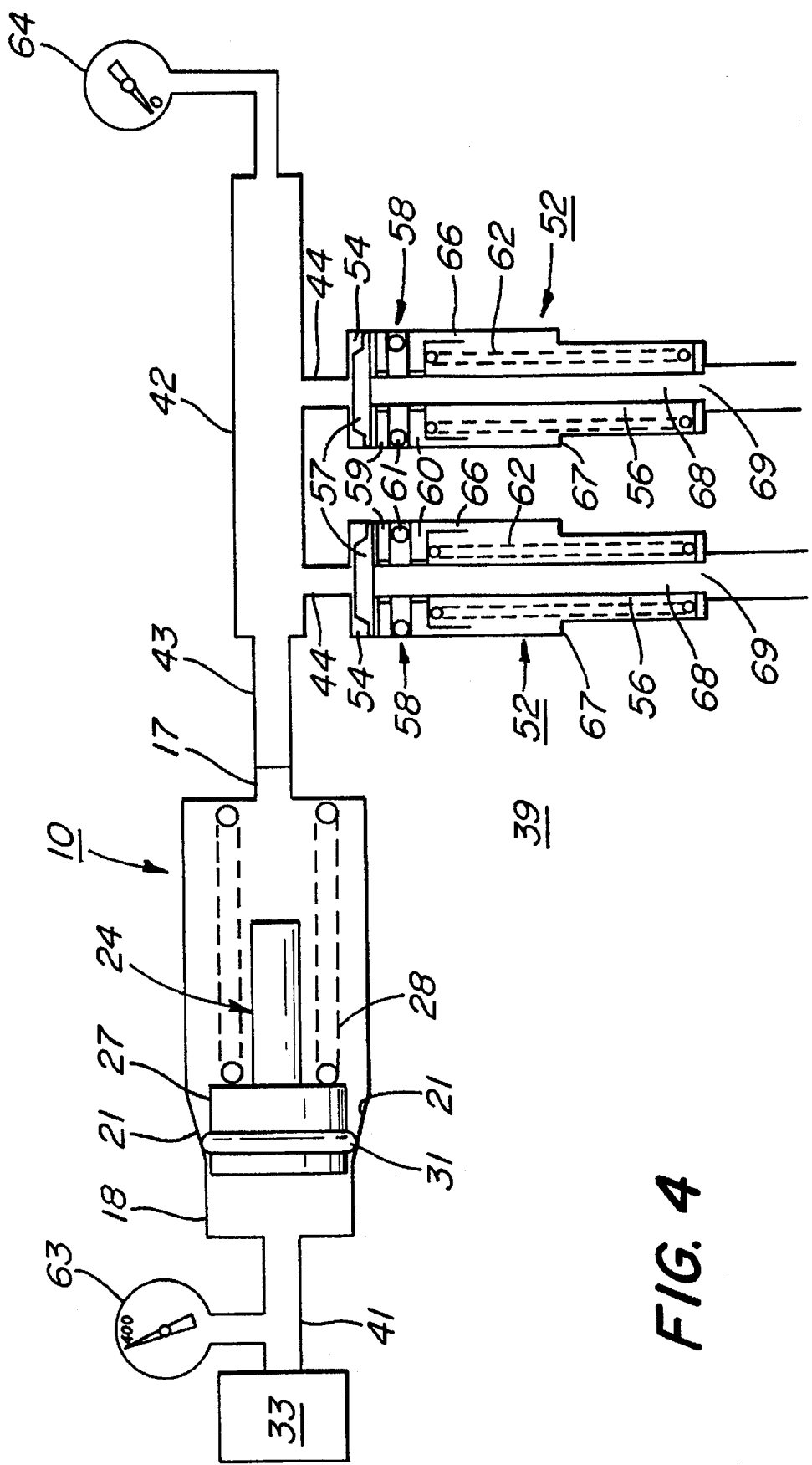
Figure 5:
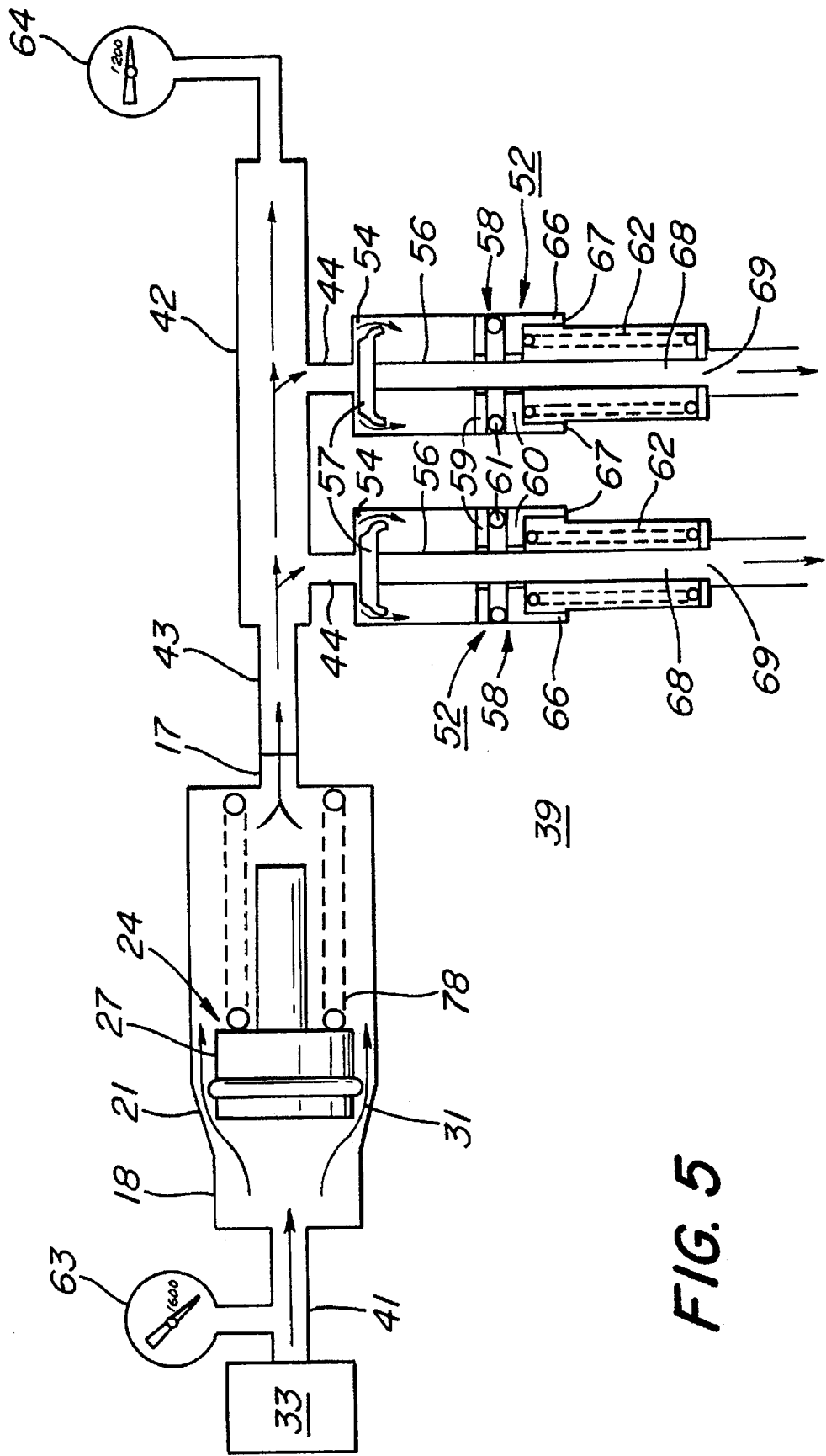
Figure 6:
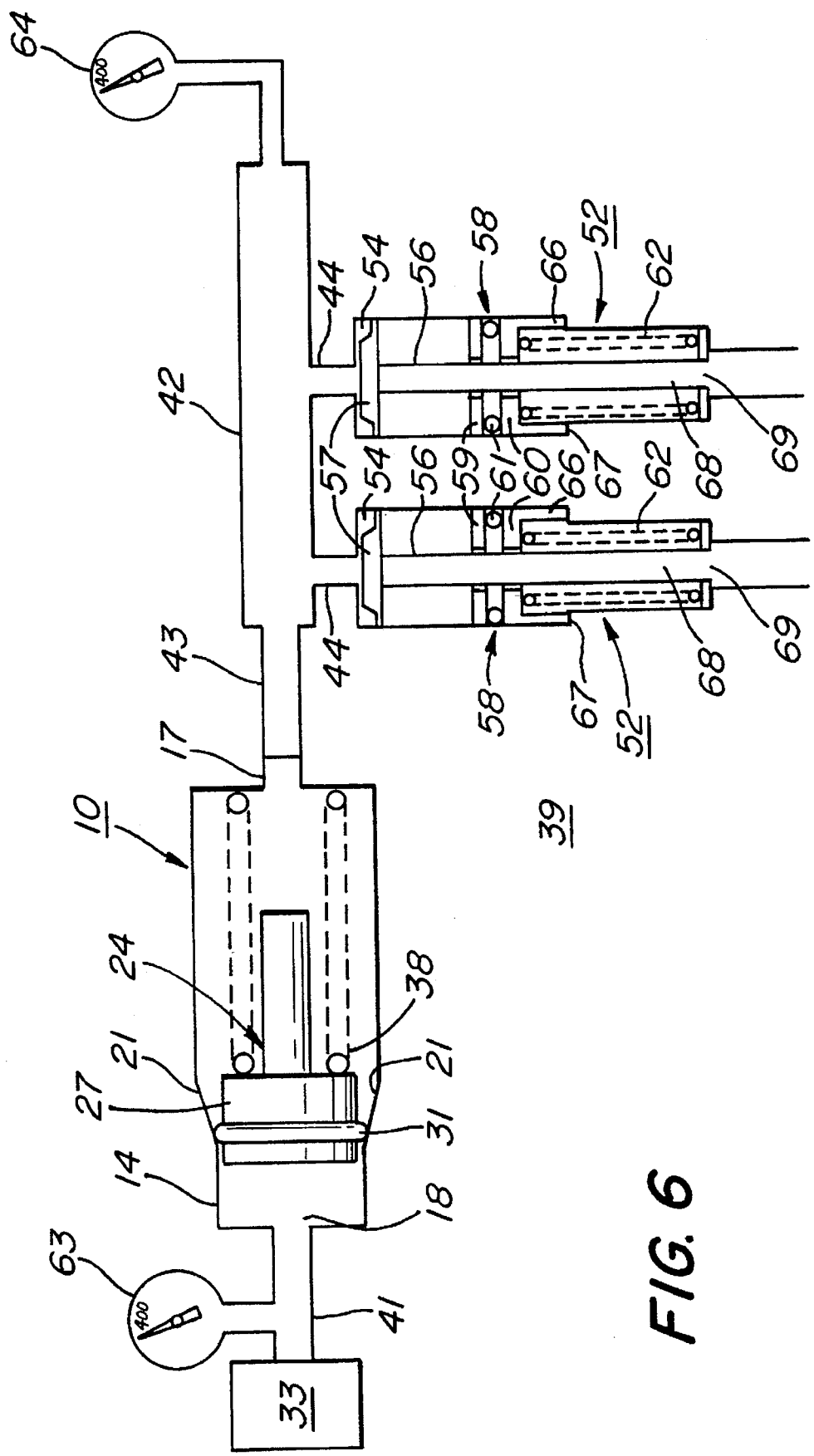
Figure 7:
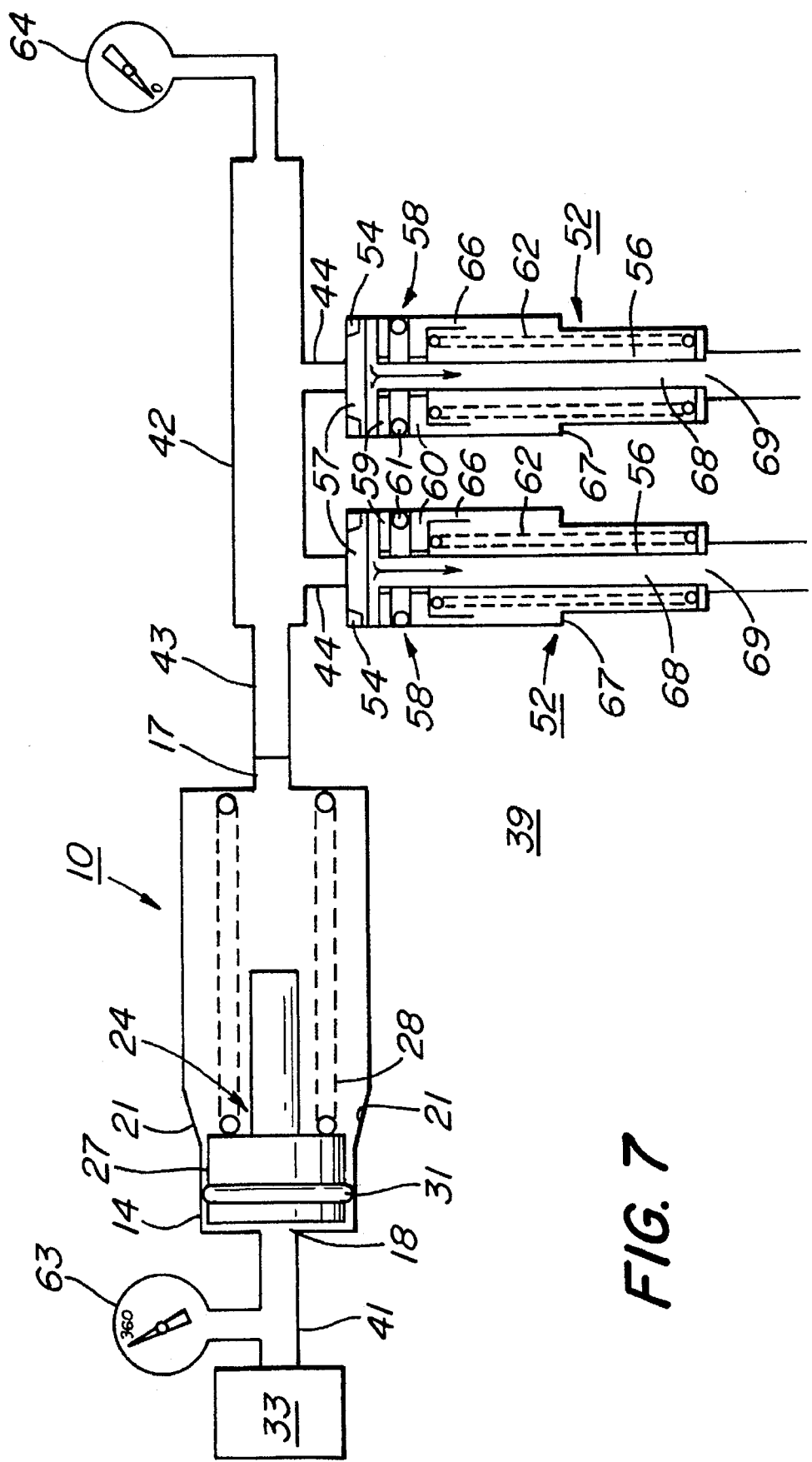

FIGS. 3–7 illustrate a grease lubricating system in accordance with the present invention, with FIG. 3 showing the components of the system before a pump cycle, FIG. 4 showing the components at a first step in the pressurizing portion of a pump cycle, FIG. 5 showing the components during a second step in the pressurizing portion of the pump cycle, FIG. 6 showing the components at the time the pump shuts off and FIG. 7 showing the components in a reset condition.

DETAILED DESCRIPTION OF THE PREFERRED EMBODIMENT(S)

Figure 1:
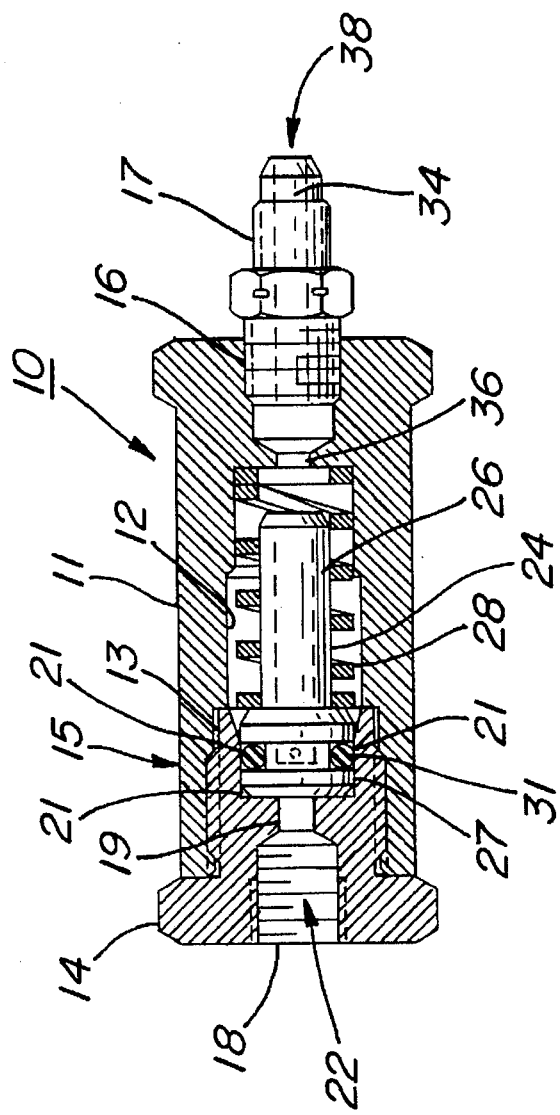
FIG. 1 is a longitudinal cross section of an injector reset valve in accordance with the present invention.
Figure 2:
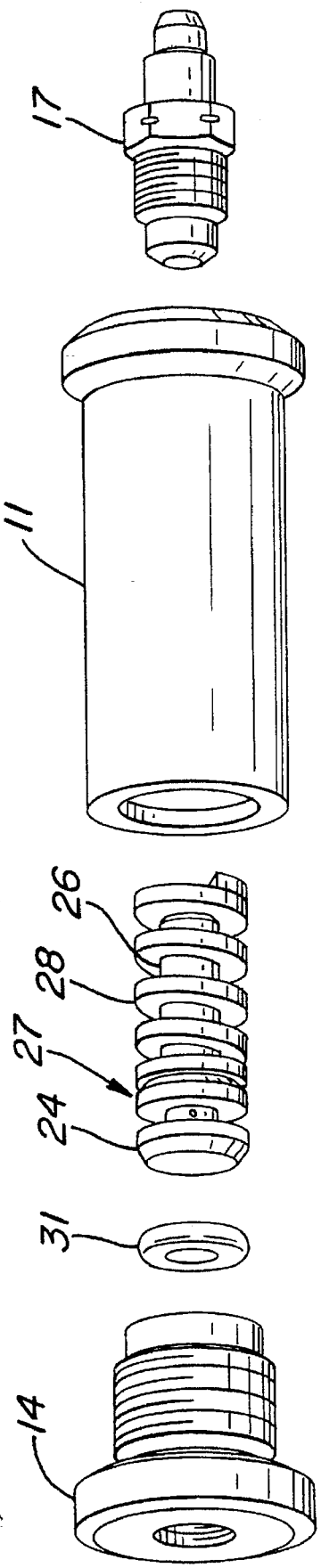
FIG. 2 is an exploded, perspective view of the components constituting the injector reset valve of FIG. 1.

Referring now to the drawings and, in particular to FIGS. 1 and 2, there is shown an injector reset valve 10 illustrating certain principles of the present invention. The injector reset valve 10 includes a housing 15 defined by an elongated casing 11 and a cap 14, the casing 11 having an internal chamber 12 terminating at one end in an enlarged bore 13 for receiving the cap 14 and terminating at the other end in a smaller bore 16 for receiving an adapter 17.

The cap 14 is connected to the casing 11 by internal threads formed in the bore 13 of the casing 11 mating with external threads on the cap 14. Similarly, the adapter 17 is connected to the casing 11 at the other end by external threads on the adaptor 17 mating with internal threads in the bore 16.

The cap 14 includes an opening 18 formed in its outer end which communicates through a longitudinal passageway 19 formed in the body of the cap 14 with an opening 20 defined by inner surfaces 21 formed at the inner end of the cap 14. The opening 18 and the passageway 19 together constitute an inlet port 22 which is adapted by means of internal threads formed in the opening 18 to be connected to the output of a pump 23 (FIG. 3).

Mounted within the chamber 12 is a piston 24 which includes a longitudinally extending shaft 26 and an enlarged cylindrical head portion 27. A large, heavy duty helical coil spring 28 is disposed about the shaft 26 with one end of the spring 28 bearing against a downstream facing shoulder on the head 27 of the piston 24 and the other end of the spring 28 bearing against upstream facing shoulders of the casing 11. The head 27 includes an annular, peripheral groove within which an O-ring 31 is positioned. In the rest or reset position of the valve, as shown in FIG. 1, the O-ring 31 bears against the inner surfaces 21 of the cap 14 to effect a seal between the chamber 12 and the inlet port 22. The inner surfaces 21 of the cap 14 diverge outwardly in the downstream direction such that when grease is introduced to the inlet port 22 to apply a pressure to the upstream facing portion of the head 27 of the piston 24, the piston moves in a downstream direction thereby moving the O-ring 31 away from the inner surfaces 21 of the cap 14 to establish communication between the inlet port 22 and the chamber 12.

The adapter 17 is designed to enable the injector valve 10 to be coupled to downstream components by means of external threads on a downstream projecting portion 33 of the adapter 17. The adapter has a longitudinally extending internal bore 34 which communicates with a longitudinal passageway 36 in the casing 11 which, in turn, communicates with the chamber 12. Together the passageway 36 and the bore 34 constitute an outlet port 38.

Referring now to FIGS. 3–7 and, in particular to FIG. 3, there is shown a grease lubricating system 39 in accordance with the present invention which incorporates the injector reset valve 10. The system 39 includes the pump 33, which may advantageously be a SureMatic Lubricator, Part No. 18130-9 available from the Bijur Lubricating Corp. An outlet from the pump 33 is connected to the injector reset valve 10 via an inlet tube 41 threadably connected to the pump outlet at one end and to the internal screw threads in the opening 18 of the cap 14 at the other end. The injector reset valve 10 is connected to an injector distributor junction 42 via a tube 43 which is threadably connected to the adapter 17 at one end and to the distribution junction 42 at its other end. The distribution junction 42 functions as a manifold to distribute lubricant to a plurality of output ports 44. The output ports 44 of the distribution junction 44 are connected to input ports 51 of injectors 52, which advantageously are oil injectors, such as type ZJB positive displacement injectors available from Bijur Lubricating Corp.

Each positive displacement injector 52 includes a housing 53 defining a chamber 54 within which is a guide element 56, a disk seal assembly 57, a piston element 58 comprising two rigid elements 59 and 60 having an O-ring 61 therebetween, and a coil spring 62. A more detailed description of the positive displacement injector may be had by referring to U.S. Pat. No. 4,494,913, the entire disclosure of which is incorporated by reference herein.

For the purpose of facilitating understanding of operation of the system, pressure gauges 63 and 64 are shown connected to the inlet tube 41 and to the distribution junction 42 respectively.

Turning now to the operation of the system, FIG. 3 shows all of the components in a reset condition prior to starting of a pump cycle. At the beginning of a pump cycle, as shown in FIG. 4, grease is forced through the inlet tube 41 to the injector reset valve 10. Accordingly, the pressure of the grease in front of the piston 24 of the injector reset valve 10 starts to increase. As the pressure increases, the piston 24 moves slightly; however, at this point the O-ring 31 is still in sealing engagement with the inner surface 21 of the cap 14. Accordingly, no net additional flow of grease from the pump 33 enters the chamber 12 of the injector reset valve 10 and, thus, no grease (other than from small piston movement) exits from the outlet port 38 so that the pressure at the distributor junction 42 is essentially zero, as can be seen from the gauge 64.

Pressure continues to build until it reaches a level at which, as seen in FIG. 5, the O-ring 31 of the piston 24 disengages from the inner surface 21 of the cap 14, thereby enabling grease from the inlet port 22 to pass into the chamber 12 and then out of the outlet port 38 into the distribution junction 42. As a result, the pressure in the distribution junction 42 and the input to the positive displacement injector 52, as shown by the gauge 64, starts to increase. This high pressure acts against the upstream face of the disk seal assembly 57 and when it reaches a predetermined level, sufficient to begin compressing the spring 62, forces the disk seal assembly 57 downstream, while at the same time the entering grease deflects the periphery of the disk seal assembly 57 allowing grease to impact on the piston 58 to cause the piston to move downstream. The piston 58 continue to move downstream thereby discharging grease through the outlet 69 until a skirt portion 66 of the piston 58 engages a shoulder 67 formed in the housing 53, at which point the motion of the piston 58 is arrested, that is, the piston 58 bottoms-out and flow from the outlet of the positive displacement injector ceases.

Turning now to FIG. 6, the pump 33 shuts off and goes into the depressurizing portion of its cycle, the pressure in the input tube 41, as shown by the gauge 63, begins to decline. The output pressure of grease at the distributor junction 42 and at the input to the positive displacement injector 52 similarly declines. As the input pressure declines, the spring 28 of the injector reset valve 10, which had been compressed during downstream movement of the piston 24, now moves the piston 24 back towards its reset position. When the O-ring 31 of the piston 24 engages the inner surface 21, it seals the inlet port 22 from the chamber.

As seen in FIG. 7, the piston 24 continues to move under the urging of the spring 28 so that it continues down the taper of the inner surface 21 and into the smaller bore in the cap 14. This action results in enough grease being displaced to reduce the pressure in the distribution junction 42 to a level substantially below the normal reset pressure for the positive displacement injector. For example, a typical type ZJBE positive displacement injector has a reset pressure below 40 psi and the injector reset valve may typically reduce the pressure in the distribution junction 42 to a level close to 0 psi. It should be noted that resetting of the positive displacement injector 52 allows the spring 62, which had been compressed during the downstream movement of the piston 58 of the injector 52, to return the piston 58 to its reset position. This action results in lubricant between the disk seal assembly 57 and the piston 58 being discharged toward the outlet 69 of the positive displacement injector 52 through an internal bore 68 of the guide element 56, and back to the underside of the piston 58.

It should be appreciated that, without the injector reset valve 10 with its relatively large spring 28, the smaller spring 62 in the positive displacement injectors could not displace sufficient grease to allow the positive displacement injectors to reset. However, because of the injector reset valve 10, sufficient grease is displaced to enable the pressure in the distributor junction and at the input to the positive displacement injector 52 to be sufficiently reduced to a level which enables the positive displacement injectors to be reset.

It should also be appreciated that one injector reset valve 10 has the capability of resetting a large number of injectors 52. Thus, although in the embodiment illustrated in FIG. 3–7, one injector reset valve has been used to reset two positive displacement injectors 52, typically an injector reset valve may be used to reset as many as 16 injectors. With No. 2 grease, however, the preferred maximum number is 10.

It should now be appreciated why grease lubricating system employing an injector reset valve 10 are considerably less expensive than conventional systems. Thus, for example, for a typical No. 2 grease lubricating system, a conventional system would require heavy duty springs and concomitant larger bodies for every injector used in the system. A system in accordance with the present invention, however, would require only one such heavy duty spring and body (i.e., in the injector reset valve 10) for every 10 low cost injectors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A grease lubrication system comprising:
    at lease one injector having an injector input port for receiving grease and an injector output port for discharging grease, the injector being actuable between an operative position in which grease may flow from the injector input port to the injector output port and reset position in which grease is prevented from flowing from the injector input port to the injector output port, the injector being actuated to the operative position when the pressure of grease at the injector input port is at least equal to a first predetermined level and being actuated to the reset position when the pressure of grease at the injector input port is no higher than a second predetermined level, lower than the first predetermined level;
    a pump for supplying grease, the pump having a pumping cycle including a pressurizing portion and a depressurizing portion; and
    common pressure reducing means connected between the pump and the injector input port for reducing the pressure at the injector input port to a level no higher than a second predetermined level during the depressurizing portion of a pump cycle to thereby cause the injector to be actuated to its reset position.

2. The grease lubrication system of claim 1, wherein the means for reducing comprises an injector reset valve.

3. The grease lubrication system of claim 2, wherein the injector reset valve comprises inlet and outlet ports, with the inlet port being connected to the pump and the outlet port being connected to the injector input port, a piston, and a spring, the piston being responsive to grease entering the injector reset valve during the pressurizing portion of the pump cycle to move to a downstream position and establish communication between the inlet and outlet ports of the injector reset valve to enable grease to flow therebetween and out of the outlet port of the injector reset valve and to compress the spring and, during the depressurizing portion of a pump cycle, the spring returning the piston to its reset position, the piston in moving from its operative position to its reset position displacing a sufficient amount of grease to lower the pressure at the injector input port to a level no higher than the second predetermined level.

4. The grease lubrication system of claim 2, wherein the injector reset valve comprises:
    a housing defining a chamber communicating with the reset valve inlet port and with the reset valve outlet port, the reset valve outlet port being positioned downstream of the reset valve inlet port, the reset valve inlet port having an upstream portion of a first diameter and a downstream portion which diverges outwardly from the upstream portion in a downstream direction and which communicates with the reset valve outlet port;
    a piston disposed within the chamber; and
    biasing means for urging the piston towards the reset valve inlet port to a sealing position blocking the reset valve inlet port to prevent any flow of grease from the reset valve inlet port to the chamber.

5. The grease lubrication system of claim 4, wherein the housing includes a hollow casing and cap at the upstream end of the casing and, wherein the reset valve inlet port is disposed in the cap.

6. The grease lubrication system of claim 5, in which the piston includes an enlarged head having a peripherally disposed sealing means for engagement with the reset valve inlet port.

7. The grease lubrication system of claim 6, wherein the diverging portion and the piston head are so structured and arranged relative to each other that the sealing means on the piston sealingly engages the reset valve inlet port at its diverging portion.

8. The grease lubrication system of claim 7, wherein the piston head and the reset valve inlet port are so structured and arranged relative to each other that the piston may enter the upstream portion of the reset valve inlet port under the urging of the biasing means during the depressurizing portion of the pump cycle.

9. The grease lubrication system of claim 8, wherein the sealing means includes a resilient member positioned within a peripheral groove of the piston head.

10. The grease lubrication system of claim 9, wherein the piston includes a shaft extending in a downstream direction from the piston head and having a smaller diameter than the piston head so as to define a piston shoulder therebetween, and wherein the spring is a coil spring having first and second opposed ends, with the first end in engagement with the piston shoulder and second end in engagement with an inner downstream end wall of the chamber.

11. The grease lubrication system of claim 10, wherein the injector includes an injector piston and an injector spring, wherein in the operative position of the injector piston is moveable to a downstream position in response to grease at the injector input port having a pressure equal to the first predetermined level, the injector spring being operative to move the injector piston to its reset position in response to grease at the injector input port having a pressure no more than the second predetermined level.

12. A grease lubrication system comprising:
    a plurality of injectors, each injector having an injector input port for receiving grease and an injector output port for discharging grease, the injector being actuable between an operative position in which grease may flow from the injector input port to the injector output port, and a reset position in which grease is prevented from flowing from the injector input port to the injector output port, the injector being actuated to the operative position when the pressure of grease at the injector input port is at least equal to a first predetermined level and being actuated to the reset position when the pressure of grease at the injector input port is no higher than a second predetermined level, lower than the first predetermined level;
    a distribution junction having a plurality of outputs corresponding respectively to the plurality of injectors, the injector input ports being respectively connected to the outputs of the distribution junction;
    a pump for supplying grease, the pump having a pumping cycle with a pressurizing portion and a depressurizing portion; and
    common pressure reducing means connected between the pump and the distributor junction for reducing the pressure at the injector input ports to a level no higher than the second predetermined level during the depressurizing portion of the pump cycle to thereby cause the injectors to be actuated to their reset position.

13. The grease lubrication system of claim 12, wherein the means for reducing comprises an injector reset valve.

14. The grease lubrication system of claim 13, wherein the injector reset valve comprises inlet and outlet ports, with the inlet port being connected to the pump and the outlet port being connected to the injector input port, a piston, and a spring, the piston being responsive to grease entering the injector reset valve during the pressurizing portion of the pump cycle to move to a downstream position and establish communication between the inlet and outlet ports of the injector reset valve to enable grease to flow therebetween and out of the outlet port of the injector reset valve and to compress the spring and, during the depressurizing portion of a pump cycle, the spring returning the piston to its reset position, the piston in moving from its operative position to its reset position displacing a sufficient amount of grease to lower the pressure at the input port of the injector to a level no higher than the second predetermined level.

15. The grease lubrication system, of claim 13, wherein the injector reset valve comprises:

a housing defining a chamber communicating with the reset valve inlet port and with the reset valve outlet port, the reset valve outlet port being positioned downstream of the reset valve inlet port, the reset valve inlet port having an upstream portion of a first diameter and a downstream portion which diverges outwardly from the upstream portion in a downstream direction and which communicates with the reset valve outlet port;

a piston disposed within the chamber; and biasing means for urging the piston towards the reset valve inlet port to a sealing position blocking the reset valve inlet port to prevent any flow of grease from the reset valve inlet port to the chamber.

16. The grease lubrication system of claim 15, wherein the housing includes a hollow casing and cap at the upstream end of the casing and wherein the reset valve inlet port is disposed in the cap.

17. The grease lubrication system of claim 16, in which the piston includes an enlarged head having a peripherally disposed sealing means for engagement with the reset valve inlet port.

18. The grease lubrication system of claim 17, wherein the diverging portion and the piston head are so structured and arranged relative to each other that the sealing means on the piston sealingly engages the reset valve inlet port at is diverging portion.

19. The grease lubrication system of claim 18, wherein the piston head and the reset valve inlet port are so structured and arranged relative to each other that the piston may enter the upstream portion of the reset valve inlet port under the urging of the biasing means during the depressurizing portion of the pump cycle.

20. The grease lubrication system of claim 19, wherein the sealing means includes a resilient member positioned within a peripheral groove of the piston head.

21. The grease lubrication system of claim 20, wherein the piston includes a shaft extending in a downstream direction from the piston head and having a smaller diameter than the piston head so as to define a piston shoulder therebetween, and wherein the spring is a coil spring having first and second opposed ends, with the first end in engagement with the piston shoulder and the second end in engagement with an inner downstream end wall of the chamber.

22. The grease lubrication system of claim 21, wherein the injector includes an injector piston and an injector spring, wherein in the operative position of the injector piston is moveable to a downstream position in response to grease at the injector input port having a pressure equal to the first predetermined level, the injector spring being operative to move the injector piston to its reset position in response to grease at the injector input port having a pressure no more than the second predetermined level.

* * * * *